United States Patent [19]

Boessler et al.

[11] 4,071,653
[45] Jan. 31, 1978

[54] POWDERY COPOLYMER COMPRISING METHYL METHACRYLATE AND MONOMER HAVING A BASIC NITROGEN ATOM

[75] Inventors: Hanns Boessler; Peter Quis, both of Darmstadt; Joachim Buechse, Astheim; Hubert Rauch, Weiterstadt, all of Germany

[73] Assignee: Rohm GmbH, Darmstadt, Germany

[21] Appl. No.: 727,013

[22] Filed: Sept. 27, 1976

[30] Foreign Application Priority Data

Sept. 30, 1975 Germany .............................. 2543542

[51] Int. Cl.$^2$ ........................................... B32B 33/00
[52] U.S. Cl. .................................... 428/332; 428/402; 428/407; 428/515; 428/520; 428/522; 526/78; 526/263; 526/909; 428/518; 428/463; 260/2.5 H
[58] Field of Search ............... 428/332, 402, 407, 520, 428/522, 515; 526/78, 263, 909

[56] References Cited

U.S. PATENT DOCUMENTS

| | | | |
|---|---|---|---|
| 3,248,356 | 4/1966 | Snyder | 526/78 X |
| 3,880,814 | 4/1975 | Mizutani | 526/263 |
| 3,959,540 | 5/1976 | Leiberich | 428/407 X |

*Primary Examiner*—P. C. Ives
*Attorney, Agent, or Firm*—Curtis, Morris & Safford

[57] ABSTRACT

A powdery copolymer having a powder particle size from 0.1 to 200 microns, said copolymer comprising at least 50 percent by weight of methyl methacrylate and 0.2 to 10 percent by weight of at least one monomer having a basic nitrogen atom, the balance, if any, being other monomers copolymerizable therewith, said copolymer being prepared by emulsion copolymerization such that all or a predominant portion of the monomer or monomers having a basic nitrogen atom is first added to the remaining monomers after the polymerization of at least half of said remaining monomers, the resulting copolymer then being recovered from the resultant latex in powder form.

9 Claims, No Drawings

POWDERY COPOLYMER COMPRISING METHYL METHACRYLATE AND MONOMER HAVING A BASIC NITROGEN ATOM

The present invention relates to powdery copolymers useful for the preparation of gel-forming masses, generally technically designated as plastisols.

Plastisols conventionally comprise finely-divided polyvinyl chloride (PVC), which is dispersed in a liquid plasticizer, and fillers. On warming, the initially liquid to pasty mass gels to form a flexible body, during which process to PVC particles dissolve in the plasticizer.

Although PVC has proved in many respects to be a good polymeric component of plastisols, it is increasingly found to be a disadvantage that, on heating, this polymer cleaves hydrogen chloride, which can cause numerous corrosion problems and is generally seen as evironmentally damaging. Gellable masses which can be used like the well-known plastisols made up from polyvinyl chloride and plasticizers may be prepared from polymers of methyl methacrylate and plasticizers. The adherance of these plasticizers to metallic surfaces which may optionally be primed is significantly improved by incorporation into the methyl methacrylate polymer of monomer units having a basic nitrogen atom. However, the stability of the resulting pastes prior to gelation is unsatisfactory. The tendency of the plastisols to gel at ambient temperature greatly restricts the choice of plasticizers which may be used.

It has been proved that the performance of the polymerization has a clear influence on the properties of the plastisols, particularly the stability of the pastes. We have found that plastisols of improved stability may be prepared if one uses a powdery copolymer having a powder particle size from 0.1 to 200 microns, said copolymer comprising at least 50 percent by weight of methyl methacrylate and 0.2 to 10 percent by weight of at least one monomer having a basic nitrogen atom, the balance, if any, being other monomers copolymerizable therewith, said copolymer being prepared by emulsion copolymerization such that all or a predominant portion of the monomer or monomers having a basic nitrogen atom is first added to the remaining monomers after the polymerization of at least half of said remaining monomers, the resulting copolymer then being recovered from the resultant latex in powder form. For example, one proceeds in such a manner that the emulsion polymerization is carried out to a conversion of 50, or even 70, percent, in a known fashion, in the absence of the nitrogen-containing monomer and the latter is gradually added first during the last 50 or 30 percent of the monomer conversion. One can proceed in this manner also with the major portion of the nitrogen-containing monomer, but adding a minor portion (less than 50 percent) at the beginning. The effect of this measure is particularly pronounced using vinyl imidazole.

Powdery copolymers of equal particle size, composition, and molecular weight as the copolymers according the invention but being prepared with continous addition of the monomers having a basic nitrogen atom over the whole polymerization period, will give plastisols of limited stability of the paste upon mixing them with usual plasticizers. Thus, a mixture of (1) a copolymer powder prepared form 87.5 percent by weight of methyl methacrylate, 12.0 percent by weight of n-butyl methacrylate, and 0.5 percent by weight of vinyl imidazole, prepared by simultaneous addition of the vinyl imidazole and the remaining monomers and subsequent spray drying, and (2) of the 1.5-fold amount (of the copolymer powder) of dioctyl phthalate will gel within six days. By contrast, a mixture of exactly the same composition with the only difference that the vinyl imidazole had been first added after 70 percent conversion of the remaining monomers was still stable after 12 days and was gellable on heating. While the viscosity of the first-mentioned mixture rose to a value 2.6 times the initial value within two days and 3.9 times the initial value within twelve days the viscosity of the second-mentioned mixture reached only a value of 1.4 times the initial value within 12 days.

The paste-stability, that is the storage stability of the plastisol in the un-gelled condition, is further influenced by the reduced viscosity of the copolymer (A). The reduced viscosity should preferably have a value, $\eta_{sp}/c \geq 300$ ml/g.

Various emulsion polymerization processes are usual for the preparation of emulsion copolymers from which the powdery copolymers can be made. The simplest process comprises emulsifying the monomers in an aqueous phase containing an emulsifier and a water-soluble radical-forming polymerization initiator, thus polymerizing the mixture. Examples for emulsifiers are sodium paraffin sulfonate (containing e.g. 15 carbon atoms), sodium dodecylsulfonate, sodium lauroyl sulfate, sodium cetyl sulfate, sodium oleyl sulfate, adducts of 3 to 100 moles of ethylene oxide and i-nonyl phenol, di-i-nonyl phenol, i-dodecyl phenol, di-isobutyl phenol, tri-isobutyl phenol, fatty alcohols (containing 8 to 22 carbon atoms), i-tridecyl alcohol, or stearic acid, or the products from sulfation and neutralization of these adducts, containing no more than 12 ethylene oxide units. These emulsifiers or mixtures of several of these emulsifiers are used in amounts from 0.1 to 5 percent by weight of the latex formed. Typical water-soluble radical-forming initiators are ammonium or patassium persulfate or hydrogen peroxide.

In order to exercise better control of the rate of the emulsion polymerization, the monomers may be added during the course of the polymerization reaction either as such or in an aqueous emulsion. Each of the processes described above may be used to prepare the emulsion polymers of the invention. Thus, all monomers except those with a basic nitrogen atom may be emulsified initially, whereupon the polymerization is started and, when at least 50 percent of the monomers have been converted, the monomer having a nitrogen atom is added. If, however, the monomers are added gradually to the polymerization mixture, the addition of the monomer having a basic nitrogen atom is started after addition of more than 50 percent by weight of all monomers. At this moment, the nitrogen-containing monomer can be mixed with the monomers which have not yet been introduced into the polymerization vessel and the resulting mixture is then added gradually. The latex particles prepared in this manner have, as a rule, particle sizes between 0.1 and 1 micron, but nevertheless form, during isolation of the polymer by coagulation or by spray drying, aggregates having particle diameters of up to 10 or 200 microns. Particles obtained by spray drying have proved particularly advantageous, particularly if, during the spray drying, temperatures are avoided at which the primary particles of the emulsion polymer sinter together into particle aggregates forming a hard body.

For many purposes, a polymer phase (A) comprising polymethylmethacrylate is highly suitable. In order to influence the particles of the gelled body, for example its toughness or its adhesion to other materials, as well as the gelation temperature and gelation rate, copolymers can be employed which, in addition to at least 50 percent by weight of units of methyl methacrylate, comprise units of further comonomers copolymerizable therewith. These monomers should not be vinyl chloride or vinylidene chloride. For example, suitable materials are alkyl esters of acrylic acid having from 1 to 4 carbon atoms in the alkyl group, or the alkyl esters of methacrylic acid having more than one carbon and up to 4 carbon atoms in the alkyl portion, as well as acrylonitrile, styrene, vinyl toluene, α-methyl styrene, vinyl esters, etc. Comonomers having particular functional groups such as, for example, hydroxyalkyl esters of acrylic acid or of methacrylic acid, these acids themselves, their amides, methylolamides, and methylol ether amides, or vinyl pyrrolidone, if they are present in the copolymers for the achievement of special properties, altogether form no more than 10 percent of the copolymer.

Examples of comonomers having a basic nitrogen atom, are dimethylaminoethyl acrylate or -methacrylate, butylaminoethyl-acrylate or -methacrylate, morpholinoethyl-acrylate or -methacrylate, or piperidinoethyl-acrylate or -methacrylate. Particularly preferred are those comonomers having the structure

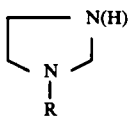

wherein the heterocyclic ring may be saturated (imidazolidines), mono-olefinically unsaturated (imidazolines), di-olefinically unsaturated (imidazoles), and R is an aliphatic group having 2 to 8 carbon atoms and containing a radical-polymerizable carbon-carbon double bond. The heterocyclic ring, further, may be substituted by one or more lower alkyl groups having 1 to 4 carbon atoms. Substituents in the 2-position are preferred, and methyl is a preferred substituent. R may be, for example, vinyl, isopropenyl, acryloxyalkyl, or methacryloxyalkyl. In the two last-mentioned substituents, the alkyl groups have 2 to 4 carbon atoms and, preferably, are ethyl. Typical comonomers of this type include 2-(1-imidazolyl)-ethyl-acrylate, 2-(1-imidazolyl)-ethyl-methacrylate, 2-(1-imidazolinyl)ethyl-acrylate or -methacrylate, N-vinylimidazolidine, N-vinyl-2-methyl-imidazolidine, and N-vinyl imidazole. The last-mentioned comonomer is the most preferred.

The monomers having basic nitrogen atoms can form a fraction between 0.2 and 10 percent by weight of the copolymer (A), but amounts above 5 percent are necessary only in rare cases if the monomer in question has a particularly high molecular weight. Amounts between 1 and 5 percent are as a rule the most advantageous. These monomers, particularly those having the heterocyclic structure mentioned above, impart a high adhesion to the plastisol on various metallic and nonmetallic substrates.

The novel powdery copolymers give gellable plastisols by mixing them with a plasticizer. As a rule, the plasticizer is present in the plastisol in an amount about equal to that of copolymer (A), nevertheless at most 1½ times the amount of the copolymer. Those plasticizers known from PVC plastisols are used which have a boiling point above 250° C. and a melting or softening point below room temperature. The paste-stability is dependent in a strong degree on the choice of the plasticizer. The plasticizer should have only a slight capacity for dissolving the polymer component at low temperatures and should be compatible with the polymer component after gelation. These requirements are filled if the polymer and the plasticizer are not too close in their polar character. Non-polar polymers are therefore preferably worked up with relatively polar plasticizers, and vice versa. The smaller the difference in the polar nature between these components, the higher should be the molecular weight of the plasticizer. The polymer component is to be viewed as relatively polar if it contains monomer units having basic nitrogen atoms or units with carboxy, carbonamide, or hydroxy groups. Units of the methyl- and ethyl-esters of acrylic- or methacrylic-acids contribute a slight, but nevertheless still detectable, polarity to the polymer, whereas the propyl-, isopropyl-, and isobutyl-esters influence the polarity little. The n-butyl esters and the alkyl esters having five or more carbon atoms make the polymer strongly non-polar. The polar character of the copolymer is determined according to the relative amounts and the strength of the polar character of the individual comonomers.

In case of an extreme departure between the polarity of the plasticizer and that of the polymer, incompatibility after gelation can arise, which is noticeable by a gradual exudation of the plasticizer. High molecular weight plasticizers tend less to such exudation. The polar character of the plasticizer depends on the same criteria which are valid also for the polymer component. Proceeding from these selection rules, in general only a few orientation tests are necessary in order to find the suitable plasticizer for any given polymer.

Polymers of a clearly polar nature are glycols, di-, tri-, or tetraethylene glycols, weakly condensed urea-formaldehyde resins or carbamide resins. Phthalic acid esters or adipic, sebacic, or maleic acid-esters, such as the dibutyl-, dioctyl-, or benzylbutyl-phthalate, linevolphthalate, (a mixture of alkyl phthalates having 4 - 8 carbon atoms in the alkyl groups), or dioctyl-adipate, -sebacate, - or maleate, are of non-polar character. An intermediate position is occupied by the higher polyglycols, phthalic acid polyesters, or adipic acid polyesters. A large number of plasticizers used technically, and their compatibility with various types of polymers, are reported by Stuehlen et al. in "Kunstoff-Rundschau," 19, 215 – 260 and 316 – 319 (1972).

To increase the toughness of the gelled mass and its adhesion to a substrate, polymerizable additives can be used in addition to the plasticizer in amounts up to 10 percent, by weight of the total plastisol. These additives comprise a plurally unsaturated free radically polymerizable monomer and a radical-forming initiator. Typical monomers of this type are the acrylic- and methacrylic-esters of polyols, such as 1,4-butanediol-dimethacrylate, triethyleneglycol dimethacrylate, neopentylglycol-dimethacrylate, trimethylolpropanetrimethacrylate, glycerine-triacrylate, or pentaerythritoltetramethacrylate. For their polymerization during the gelling process, free radical-forming iniatiators are employed which decompose at the gelation temperature: for example, dicumyl peroxide, cumene-hydroperoxide, or tert.-butyl hydroperoxide.

The plastisols contain inorganic fillers such as finely-divided silicic acid, quartz flour, chalk, kaolin, barite, titanium dioxide, asbestos flour, and the like, in amounts of from 15 to 60 percent by weight.

The plastisols are used as coatings on metallic or mineral substrates. Typical metal substrates include untreated iron, phosphated iron, electro-coated iron, aluminum, and copper. They are applied in a layer thickness of 0.1 to 5 mm by dipping, spraying, or painting and are gelled by heating to temperatures above 90° C. Typical practical uses are the coating of wires, the inner coating of tubes, the overcoating of shaped bodies of asbestos cement, or as a protective undercoating for vehicles.

A better understanding of the invention and of its many advantages will be had by reference to the following Examples, in which the components are given in parts by weight.

EXAMPLE 1

A. Preparation of a Copolymer Dispersion

In a closed reaction vessel, 0.25 g of ammonium persulfate and 0.75 g of sodium $C_{15}$-paraffin sulfonate were dissolved in 1000 g of water at 80° C. An emulsion prepared from 2187 g of methyl methacrylate, 300 g of n-butyl methacrylate, 5.625 g of the emulsified mentioned above and 1450 g of water was added to the said aqueous solution under stirring within 3 hours at 80° C. Separately, 12.5 g of 1-vinyl-imidazole were added within the last hour. Thereupon, the reaction mixture was kept at 80° C. for 2 hours, then cooled and filtered through a fine-meshed sieve. A coagulant-free copolymer dispersion having a solids content of 49 percent by weight was obtained.

B. Preparation of a Polymer Powder

The dispersion described under A was introduced in direct flow with air at 150° C. into a spray drying installation equipped with a spraying nozzle. The mixing ratio of dispersion to air was set so that the sprayed product leaves the installation at an air outlet temperature of 65° C. in the form of a dry, fine particulate powder containing no glassy ingredients. The polymer had a reduced viscosity $\eta_{sp}/c = 484$ ml/g (in chloroform).

C. Preparation of a Comparative Product

A dispersion was prepared according to method A with the difference that the 1-vinyl-imidazole was emulsified with the remaining monomers and the entire emulsion was introduced into the reaction vessel within 3 hours.

D. Preparation of Plastisols

A mixture of
20 parts of polymer powder (B)
20 parts of benzyl butyl phthalate
30 parts of chalk
was stored at 23° C. and was still workable after 8 days. The plastisol was applied to EC-steel sheet and baked for 10 minutes at 180° C. The resulting coating was flexible and adhered strongly to the steel surface.

EXAMPLE 2

A. Preparation of a Copolymer Dispersion

In a closed reaction vessel equipped with a stirrer, 0.051 g of ammonium persulfate and 0.15 g of sodium $C_{15}$-paraffin sulfonate were dissolved in 240 g of water at 80° C. An emulsion prepared from 344 g of methyl methacrylate, 48 g of n-butyl methacrylate, 2.55 g of the emulsifier mentioned above, and 350 g of water was introduced into the vessel under stirring within 3 hours at 80° C. Separately, 8 g of 2-(1-imidazolyl)-ethyl methacrylate were added within the last hour. The reaction mixture was kept at 80° C. for two hours, cooled, and filtered through a fine-meshed sieve. A 40% (by weight) coagulant-free dispersion was obtained.

B. Preparation of a Polymer Powder

The dispersion A was spray dried as in Example 1 B using air of 120° C. The powder left the installation at a temperature of 60° C. The polymer had a reduced viscosity $\eta_{sp}/c = 466$ ml/g (in chloroform).

C. Preparation of a Plastisol

A mixture of
20 parts of polymer powder (B)
10 parts of tricresyl phosphate
20 parts of dioctyl phthalate
20 parts of barium sulfate
40 parts of chalk
was applied to EC-sheet in a thickness of about 3 mm and baked for 20 minutes at 140° C. The coating was flexible and strongly adherent to the substrate. The plastisol was storable for more than 3 months at ambient temperature without gelling.

EXAMPLE 3

A. Preparation of a Dispersion

The method of Example 2 A was repeated with the difference that 8 g of 1-vinyl-2-methyl-imidazole were used instead of imidazolyl-ethyl methacrylate. This monomer was added separately within the last 1.5 hours of the polymerization period. A coagulant-free dispersion having a solids content of 40.2% was obtained.

B. Preparation of a Polymer Powder was performed as in Example 2 B. The reduced viscosity of the resulting polymer was $\eta_{sp}/c = 464$ ml/g (in chloroform).

C. Preparation of a Plastisol

A mixture of
20 parts of polymer powder (B)
20 parts of dioctyl phthalate
10 parts of dibutyl phthalate 50 parts of chalk was applied to EC-sheet with a toothed doctor blade and gelled in 25 minutes at 120° C. The resulting coating was flexible and adhered strongly both in a thin layer or in layer of 5 mm thickness. The plastisol was storable for more than 3 months without gelling at ambient temperature.

EXAMPLE 4 to 9

According to the method of Examples 1 to 3, various polymer powders were prepared and worked into plastisols. The details of the polymerization methods are given in Table I below. Table II contains further details of the spray drying process and the composition of the plastisols.

Example 4a is a comparative test to Example 4.

In Example 4a, the nitrogen-containing monomer was added from the beginning of the polymerization (as in Example 1 C). The plastisol prepared from the resulting polymer powder was no longer workable after a storage time of one week.

copolymer then being recovered from the resultant latex in powder form.

TABLE I

| Example No. | Aqueous phase | | | polymer-ization temp. °C | monomer emulsion | | | | | | | addition period | | solids content % b.w. |
|---|---|---|---|---|---|---|---|---|---|---|---|---|---|---|
| | H$_2$O g | APS g | emulsifier g | | H$_2$O g | emulsifier (as in 4th column) g | MMA g | comonomer | | N-containing monomer | | total (hours) | time of addition of N-monomer after start (hours) | |
| | | | | | | | | type | g | type | g | | | |
| 4 | 1000 | 0.25 | 0.75A | 80° | 1450 | 5.62 | 2187 | BMA | 300 | VJ | 50 | 3 | 2 | 50 |
| 4 a | 1000 | 0.25 | 0.75A | 80° | 1450 | 5.62 | 2187 | BMA | 300 | VJ | 50 | 3 | 0 | 50 |
| 5 | 400 | 0.1 | 0.3A | 80° | 560 | 4.7 | 690 | BMA | 300 | VJ | 10 | 3 | 2 | 50 |
| 6 | 400 | 0.1 | 0.3A | 80° | 560 | 4.7 | 590 | BMA EA | 300 100 | VJ | 10 | 3 | 2 | 50 |
| 7 | 240 | 0.05 | 0.15A | 80° | 350 | 2.55 | 344 | BMA | 48 | VJn | 8 | 3 | 1.5 | 40 |
| 8 | 400 | 0.1(+) | 0.2B | 80° | 600 | 19 | 870 | BMA | 120 | DMA | 10 | 3 | 1.5 | 50 |
| 9 | 240 | 0.05 | 0.15A | 80° | 350 | 2.55 | 344 | BMA | 48 | MoM | 8 | 3 | 2 | 40 |

(+)4,4-azo-bis-(4-cyanovaleric acid) was used instead of APS
A = sodium C$_{15}$-paraffin sulfonat
B = adduct of triisobutylphenol + 7 ethylene oxide, sulfated, sodium salt
APS = ammonium persulfate
MMA = methyl methacrylate
BMA = n-butyl methacrylate
EA = ethyl acrylate
VJ = vinyl imidazole
VJn = N-vinyl-2-methyl-imidazoline
MoM = morpholinoethyl methacrylate
DMA = dimethylaminoethyl methacrylate

TABLE II

| Example No. | 4 | 4a comparative test | 5 | 6 | 7 | 8 | 9 |
|---|---|---|---|---|---|---|---|
| spray drying air temp.at inlet ° C | 150 | 150 | 120 | 120 | 120 | 120 | 120 |
| air temp.at outlet ° C | 65 | 65 | 62 | 62 | 60 | 60 | 60 |
| reduced viscosity $\eta_{sp}/c$ (in chloroform) ml/g | 494 | 583 | 437 | 472 | 428 | 453 | 443 |
| Composition of the Plastisols (in parts by weight) | | | | | | | |
| polymer powder | 20 | 20 | 20 | 20 | 20 | 20 | 20 |
| adipic acid polyester | 30 | 30 | — | — | — | — | — |
| phthalic acid polyester | — | — | — | 30 | — | — | — |
| dimethoxyethyl phthalate | — | — | — | — | 7.5 | — | — |
| dioctyl phthalate | — | — | — | — | 22.5 | 20 | 15 |
| dibutyl benzyl phthalate | — | — | — | — | — | — | 15 |
| low viscous urethane-formaldehye-plasticizer | — | — | 30 | — | — | — | — |
| carbamic acid resin | — | — | — | — | — | 10 | — |
| trimethylolpropane-trimethacrylate | 5 | 5 | — | — | — | 5 | — |
| 1,4-butanediol dimethacrylate | — | — | — | — | — | — | 5 |
| dicumyl peroxide | 0.25 | 0.25 | — | — | — | 0.25 | 0.25 |
| chalk | 45 | 45 | 40 | 50 | 50 | 60 | 50 |
| glass powder | — | — | 10 | — | — | — | — |
| minimal storability at room-temperature without lost of workability (in weeks) | 1 | 0 | 1 | 6 | 12 | 6 | 6 |

What is claimed is:

1. A powdery copolymer having a powder particle size from 0.1 to 200 microns, said copolymer comprising 50 to 99.8 percent by weight of methyl methacrylate, 0.2 to 10 percent by weight of at least one monomer having a basic nitrogen atom, 0 to 49.8 percent by weight of at least one other monomer selected from the group consisting of alkyl acrylates having 1 to 4 carbon atoms in the alkyl group, alkyl methacrylates having 2 to 4 carbon atoms in the alkyl group, acrylonitrile, styrene, vinyl toluene, α-methyl styrene, and vinyl esters, and 0 to 10 percent by weight of at least one member selected from the group consisting of vinyl pyrrolidone and the hydroxyalkyl esters, amides, methylolamides, and methylol ether amides of acrylic acid and methacrylic acid, said copolymer being prepared by emulsion copolymerization such that at least 50 percent by weight of the monomer or monomers having a basic nitrogen atom is first added to the monomer or monomers not having a basic nitrogen atom after the polymerization of at least half of said monomer or monomers not having a basic nitrogen atom, the resulting copolymer then being recovered from the resultant latex in powder form.

2. A powdery copolymer as in claim 1 wherein all of the monomer or monomers having a basic nitrogen atom is first added to the monomer or monomers not having a basic nitrogen atom after the polymerization of at least half of said monomer or monomers not having a basic nitrogen atom.

3. A powdery copolymer as in claim 1 wherein at least 50 percent by weight of the monomer or monomers having a basic nitrogen atom is first added to the monomer or monomers not having a basic nitrogen atom after the polymerization of at least 70 percent of said monomer or monomers not having a basic nitrogen atom.

4. A powdery copolymer as in claim 1 wherein all of the monomer or monomers having a basic nitrogen atom is first added to the monomer or monomers not having a basic nitrogen atom after the polymerization of at least 70 percent of said monomer or monomers not having a basic nitrogen atom.

5. A powdery copolymer as in claim 1 wherein said resulting copolymer is recovered from said resultant latex by spray drying.

6. A powdery copolymer as in claim 2 wherein said latex is spray dried at a temperature below the temperature at which the primary particles therein sinter to form hard particle aggregates.

7. A powdery copolymer as in claim 1 wherein said monomer having a basic nitrogen atom is N-vinyl-imidazole, N-vinyl-imidazole, or N-vinyl-2-methyl-imidazoline.

8. A powdery copolymer as in claim 1 which has a reduced viscosity, $\eta_{sp}/c, \geqq 300$ ml/g.

9. A powdery copolymer as in claim 1 having a powder particle size from 0.1 to 20 microns.

* * * * *